United States Patent
Chandrashekhara et al.

(10) Patent No.: US 12,277,062 B1
(45) Date of Patent: Apr. 15, 2025

(54) METADATA PRE-PAGING ON ASYNCHRONOUS REMOTE REPLICATION TO IMPROVE REMOTE ARRAY PERFORMANCE

(71) Applicant: Dell Products L.P., Hopkinton, MA (US)

(72) Inventors: Sandeep Chandrashekhara, Shrewsbury, MA (US); Ramesh Doddaiah, Westborough, MA (US); Mohammed Asher, Bangalore (IN); Aamir Mohammed, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 28 days.

(21) Appl. No.: 18/531,869

(22) Filed: Dec. 7, 2023

(51) Int. Cl.
  *G06F 12/08* (2016.01)
  *G06F 12/0862* (2016.01)
(52) U.S. Cl.
  CPC .............................. *G06F 12/0862* (2013.01)

(58) Field of Classification Search
  CPC .................................................. G06F 12/0862
  See application file for complete search history.

(56) References Cited

U.S. PATENT DOCUMENTS

2003/0191916 A1* 10/2003 McBrearty .......... G06F 11/1464
  711/112

* cited by examiner

*Primary Examiner* — Jae U Yu
(74) *Attorney, Agent, or Firm* — Anderson Gorecki LLP

(57) ABSTRACT

In asynchronous remote replication, write IOs are accumulated in capture cycles and sent to a remote storage system in transmit cycles. In order to cause metadata cache hits at the remote storage system, write IO data and associated metadata hints such as logical block addresses being updated are sent in successive cycles. The metadata hints, which are received at the remote storage system before the corresponding write IO data, are used to prefetch metadata associated with the logical block addresses being updated to replicate the write IO.

20 Claims, 5 Drawing Sheets

METADATA PRE-PAGING ON ASYNCHRONOUS REMOTE REPLICATION TO IMPROVE REMOTE ARRAY PERFORMANCE

TECHNICAL FIELD

The subject matter of this disclosure is generally related to data storage systems.

BACKGROUND

Electronic data storage is a critical infrastructure for organizations that rely on software. A typical datacenter includes clusters of server computers and data storage nodes that are interconnected via network switches. The servers run instances of host applications that support organizational processes such as email, accounting, inventory control, e-business, and engineering. Host application data is maintained by the storage nodes. The data storage nodes may include, or be part of, storage arrays, storage area networks (SANs), and network-attached storage (NAS), for example, and without limitation.

The term "host application image" is used to refer to all the data for a single host application or the collection of logical disk drives, known as storage objects, on which that data is maintained. A primary host application image on a storage object R1 that is accessed by the host applications may be replicated on a corresponding storage object R2 at a remote data center to enable R1-to-R2 failover without significant interruption of the host applications. The R1 and R2 replicas may be further protected by creating incremental backups known as snapshots that enable the host application image to be restored to its state at an earlier point in time.

In general, data replication may be either synchronous or asynchronous. Synchronously replicated host application write IOs are contemporaneously written to both the R1 and R2 storage objects in real time. Acknowledgments are not sent to the host until the write IO data is stored in cache on both storage arrays. Asynchronous replication maintains a dependent-write consistent copy between the R1 and R2 storage objects. All host writes to R1 are collected over a configurable fixed time interval, e.g., from 15-60 seconds, and sent to the remote storage array as a "delta set." Unlike synchronous replication, the primary storage array does not wait for an acknowledgement that the data is in cache at the remote storage array before marking the updated tracks as valid and sending an acknowledgement to the host server.

SUMMARY

Some aspects of the present disclosure are predicated in-part on recognition that asynchronous data replication can amplify the latency associated with a metadata cache miss in storage systems that used paged metadata. When a storage array receives an IO to access a storage object, locally stored metadata associated with that storage object is used to process the IO. That metadata must be paged-in to volatile memory from non-volatile disk storage if it is not already present in volatile memory when the IO is received, which is known as a "metadata cache miss." A metadata cache miss contributes to IO processing latency relative to a "metadata cache hit" in which the metadata is already present in volatile memory when the IO is received because volatile memory has lower access latency than non-volatile disk storage. If the IO is being replicated by a remote storage array, the same metadata cache miss may occur again when the data is received by the remote storage array, thereby amplifying the metadata cache miss. A metadata cache miss may occur at the remote storage array even if the same IO results in a metadata cache hit at the primary storage array.

An apparatus in accordance with some embodiments comprises: a plurality of non-volatile drives containing data of an R1 storage object and metadata of the R1 storage object; at least one compute node configured to manage access to the R1 storage object, the compute node comprising multi-core processors and volatile memory, the volatile memory comprising a first partition configured to store pages of the metadata and a second partition configured to store tracks of the data; and a first metadata prefetch thread running on the multi-core processors and configured to generate metadata hints corresponding to incoming writes to the R1 storage object, the metadata hints being sent to a remote storage system that maintains an R2 storage object that is an asynchronous replica of the R1 storage object, the first metadata prefetch thread configured to send each of the metadata hints to the remote storage system before sending associated write data to the remote storage system for replication on the R2 storage object.

A method in accordance with some embodiments comprises: generating metadata hints corresponding to incoming writes to an R1 storage object at a first storage system; sending the metadata hints a second storage system that maintains an R2 storage object that is an asynchronous replica of the R1 storage object; and sending write data corresponding to the incoming writes to the R1 storage object to the remote storage system for replication on the R2 storage object after sending the metadata hints.

In accordance with some embodiments, a non-transitory computer-readable storage medium stores instructions that when executed by a computer perform a method comprising: generating metadata hints corresponding to incoming writes to an R1 storage object at a first storage system; sending the metadata hints a second storage system that maintains an R2 storage object that is an asynchronous replica of the R1 storage object; and sending write data corresponding to the incoming writes to the R1 storage object to the remote storage system for replication on the R2 storage object after sending the metadata hints.

This summary is not intended to limit the scope of the claims or the disclosure. All examples, embodiments, aspects, implementations, and features can be combined in any technically possible way. Method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility.

The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multipurpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Figure 1:
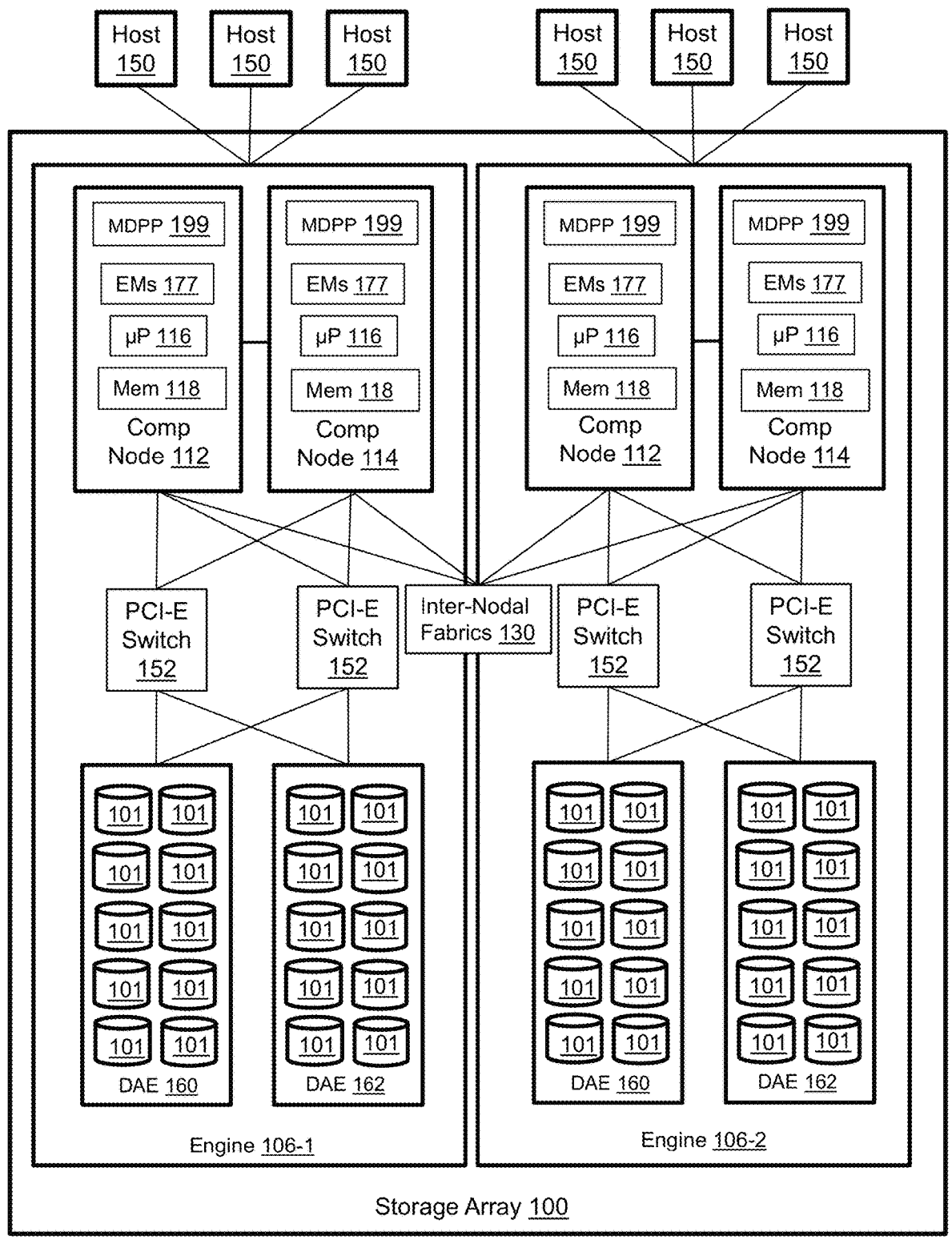
FIG. 1 illustrates a storage array with metadata pre-paging threads that facilitate asynchronous replication.

FIG. 1 illustrates a storage array 100 with Meta Data Pre-Paging (MDPP) threads 199 that facilitate asynchronous replication. As will be explained below, the MDPP threads perform different tasks depending on whether they are supporting a replication initiator R1 or a replication target R2. In some configurations a storage object may be both a replication initiator and a replication target. The illustrated storage array 100 is shown with two engines 106-1, 106-2, but might include any number of engines. The engines are interconnected via redundant inter-nodal channel-based InfiniBand fabrics 130. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory.

Each compute node 112, 114 is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more adapters and ports for communicating with host servers 150 for servicing IOs from the host servers. Each compute node also includes one or more adapters for communicating with other compute nodes via the redundant inter-nodal channel-based InfiniBand fabrics 130. The processors 116 run threads of emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. The MDPP threads 199 also run on processors 116 and may exist in the memory and on the managed drives.

Figure 2:
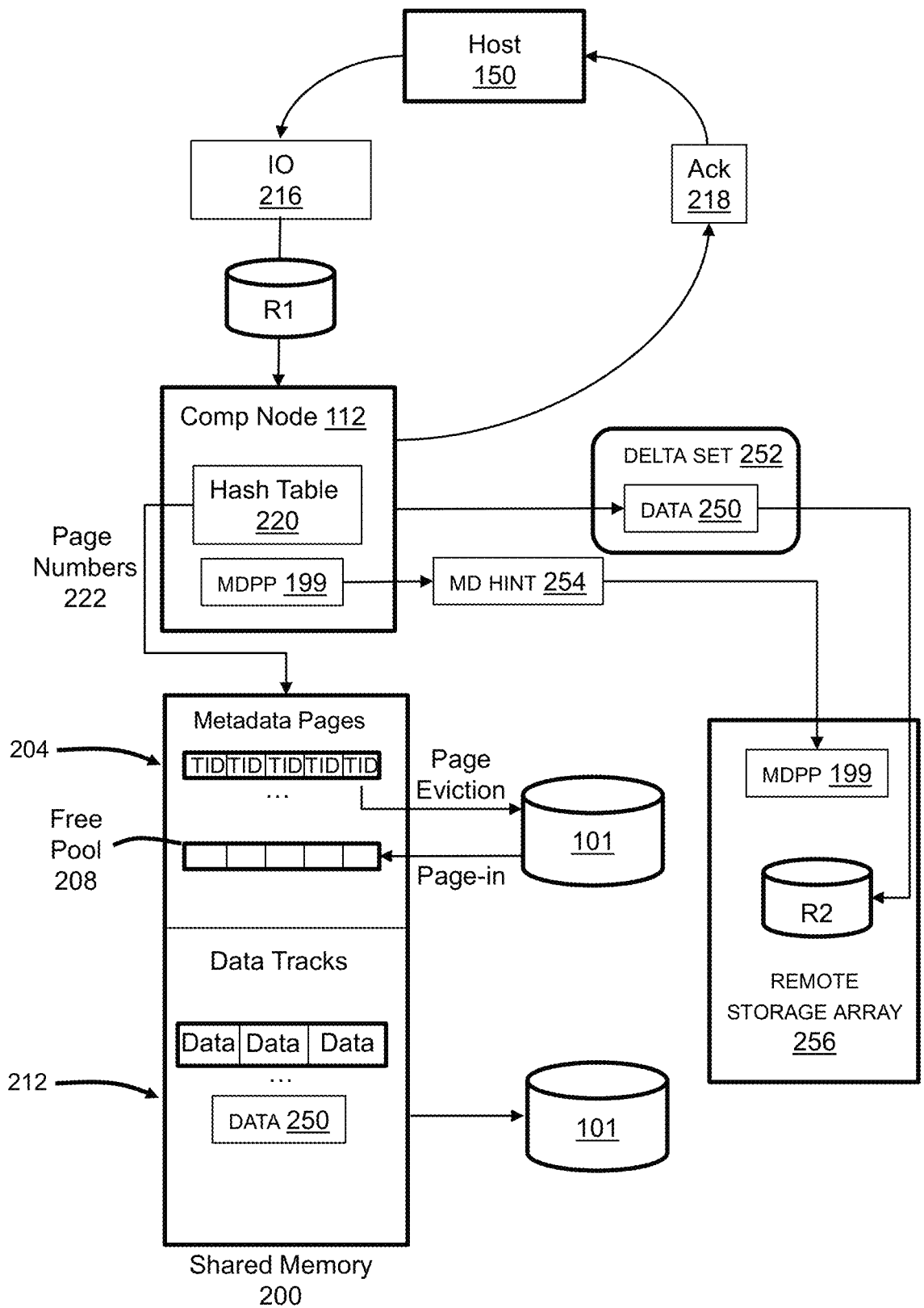
FIG. 2 illustrates IO processing and remote replication in a metadata cache-miss scenario.

Referring to FIGS. 1 and 2, a host application image is persistently stored on the managed drives 101 and logically stored on a production storage object R1 that can be discovered by the host servers. Without limitation, storage object R1 may be referred to as a volume, device, or LUN, where a logical unit number (LUN) is a number used to identify logical storage volumes in accordance with the small computer system interface (SCSI) protocol. From the perspective of the host servers 150, storage object R1 is a single disk or set of disks having logical block addresses (LBAs) on which data used by the instances of a host application resides. However, the host application data is stored at non-contiguous addresses distributed on the managed drives 101. Locally stored metadata maps between the LBAs of R1 and physical addresses of the managed drives 101. There may be a large number of host servers and the storage array may maintain a large number of storage objects.

The compute nodes 112, 114 are configured to function in an integrated manner. Each compute node dedicates a portion or partition of its respective local memory 118 to a logical shared memory 200 that can be accessed by other compute nodes, e.g., via direct memory access (DMA) or remote DMA (RDMA), for servicing IOs. A complete record of all metadata for R1 is maintained on the managed drives 101. The metadata includes mappings between LBAs of R1 and the managed drives 101. A first portion 204 of the shared memory 200 is dedicated for holding a subset of pages of the metadata that are paged-in (copied) from the managed drives 101 on an as-needed basis. New metadata may also be created in the first portion 204 of the shared memory. The pages of metadata, which may all be a single fixed size, include track identification tables (TIDs) that indicate, among other things, where associated tracks of data are in the shared memory with pointers that map between storage object LBAs, data tracks in shared memory, and physical addresses on managed drives. A free pool 208 of empty address space that does not contain pages of metadata facilitates efficient page-in of metadata from the managed drives by providing already-available free space in the shared memory when it becomes apparent that metadata page-ins are required. Pages of metadata may be evicted from the first portion of the shared memory in page-out operations, e.g., moved to the managed drives 101 if the page has been updated in the shared memory, thereby increasing the size of the free pool 208. A complete record of all data for R1 is maintained on the managed drives 101. A second portion 212 of the shared memory 200 is dedicated for temporarily holding selected tracks 214 of the data, where tracks are allocation units that may all have the same fixed size. Track data that is being updated by a write IO is copied into the second portion 212 of the shared memory 200 and eventually destaged to the managed drives 101.

In response to an IO command 216 sent by a host 150 to write data 250 to LBAs on R1, an emulation thread on compute node 112 finds the pages of metadata associated with the LBAs being updated by the IO 216. Specifically, the emulation thread uses information such as the device number, cylinder number, head, and size indicated in the IO 216 as inputs to a hash table 220 that outputs page numbers 222 of the corresponding TIDs in the metadata pages in the first portion 204 of the shared memory 200. The TIDs in those pages are associated with data tracks in the second portion 212 of the shared memory where the IO data 250 is stored until being destaged to the managed drives. An acknowledgement 218 is sent to the host 150 after the IO data is in the second portion 212 of shared memory. However, the metadata pages indicated by the page numbers are not necessarily located in the shared memory 200 when the IO 216 is received, so the pages indicated by the page numbers may have to be paged-in from the managed drives 101 by copying the metadata into free pages in the free pool 208. That scenario, known as a "metadata cache miss," introduces IO processing latency relative to a "metadata cache hit" in which the metadata pages indicated by the page numbers are already located in the shared memory when the IO is received because accessing the managed drives is slower than accessing the shared memory and the metadata associates LBAs on R1 with physical addresses on the managed drives so the data cannot be processed and destaged until the metadata is paged-in.

Contemporaneously with IO processing, an MDPP thread 199 running on the compute node generates a metadata hint 254 associated with IO 216. The metadata hint may identify R1/R2 as the target of the write command and indicate the LBAs being updated by IO 216. Other information such as the device number, cylinder number, head, and size indicated in IO 216 may also be included. The metadata hint 254 is sent to the remote storage array 256 that maintains R2, where R2 is an asynchronous replica of R1. An MDPP thread 199 running on the remote storage array 256 uses the metadata hint 254 to identify pages of metadata to pre-fetch for subsequent replication of the IO data 250.

After IO processing and hint transmission, a replication thread adds a copy of the IO data 250 to a delta set 252 that is used to update R2, i.e., to asynchronously replicate the IO 216. The delta set interval, e.g., 15-60 seconds, is generally greater than the IO processing latency of the primary storage array so the IO data 250 will generally be in shared memory 200 prior to being added to a delta set 252 and transmitted to the remote storage array 256. The metadata hint 254 for data 250 is sent before the delta set 252 that includes data 250 is sent so the MDPP thread 199 running on the remote storage array 256 prefetches the metadata pages that will be needed to replicate data 250 on device R2 before receipt of the data, thereby avoiding a metadata cache miss in the remote storage array 256.

Figure 3:
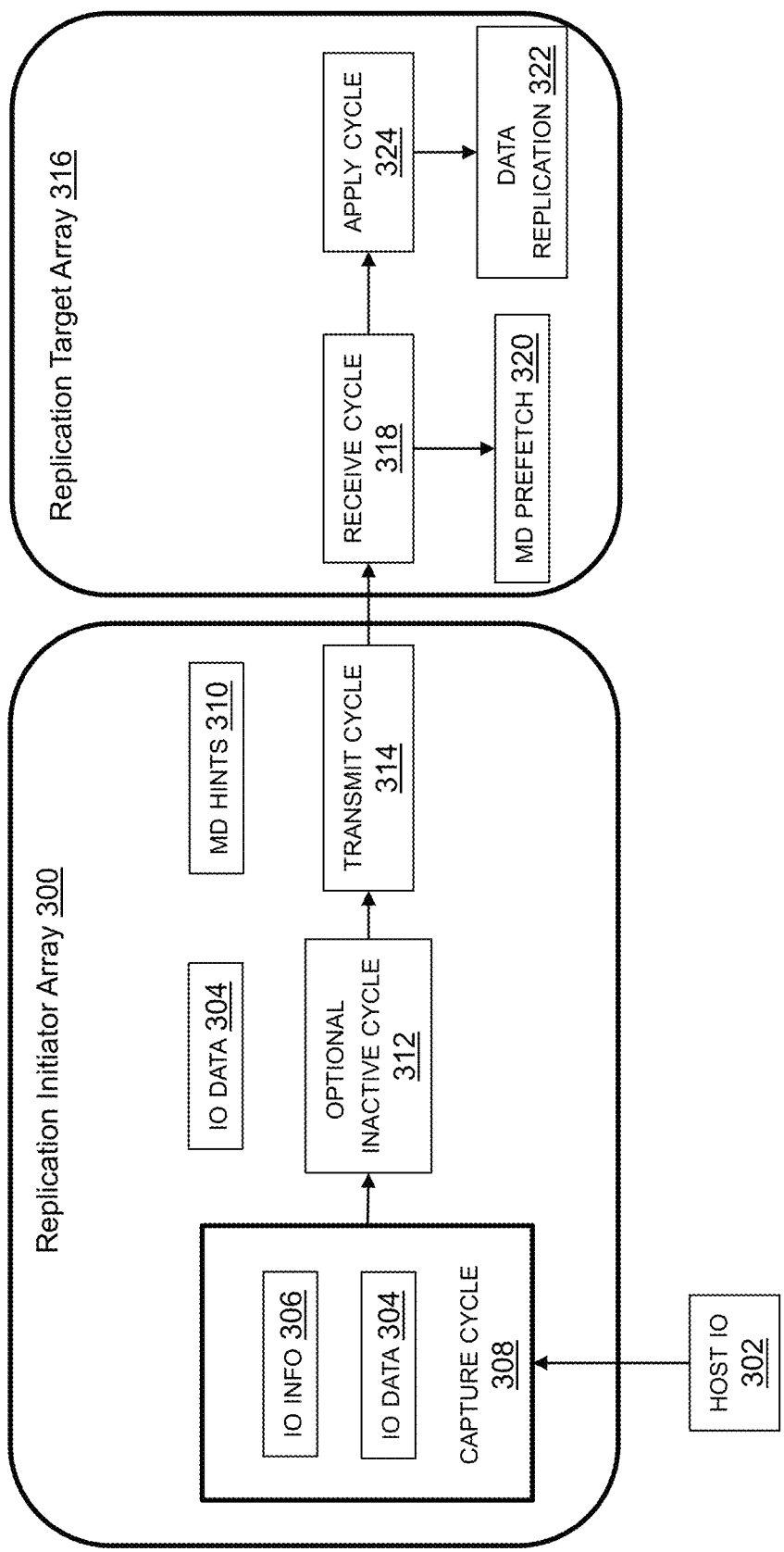
FIG. 3 illustrates cycles associated with asynchronous replication.

FIG. 3 illustrates a series of fixed-time cycles associated with asynchronous replication. Each cycle may have a fixed temporal length equal to the delta set interval, e.g., 15-60 seconds. In response to receipt of a host write IO 302, a replication initiator storage array 300 stores the IO data 304 on R1 and collects corresponding IO information 306 (LBAs, etc.) in a capture cycle 308. The IO information is used to generate metadata hints 310 in either an optional inactive cycle 312 or a transmit cycle 314. The metadata hints 310 generated from the IO information 306 are cycle-displaced relative to the IO data 304 such that the metadata hints 310 are one cycle ahead of the IO data 304 in terms of processing. The metadata hints 310 are sent from the replication initiator array 300 to the replication target array 316 in the transmit cycle 314. The IO data 304 is sent from the replication initiator array to the replication target array in the next successive transmit cycle 314. Consequently, the metadata hints and the IO data are received by the replication target array in successive receive cycles 318. In the first of those successive receive cycles the replication target array uses the metadata hints to perform a metadata prefetch 320. In the second of those successive receive cycles the replication target array receives the IO data. The IO data is used to perform data replication 322 in an apply cycle 324 using the prefetched metadata.

Figure 4:
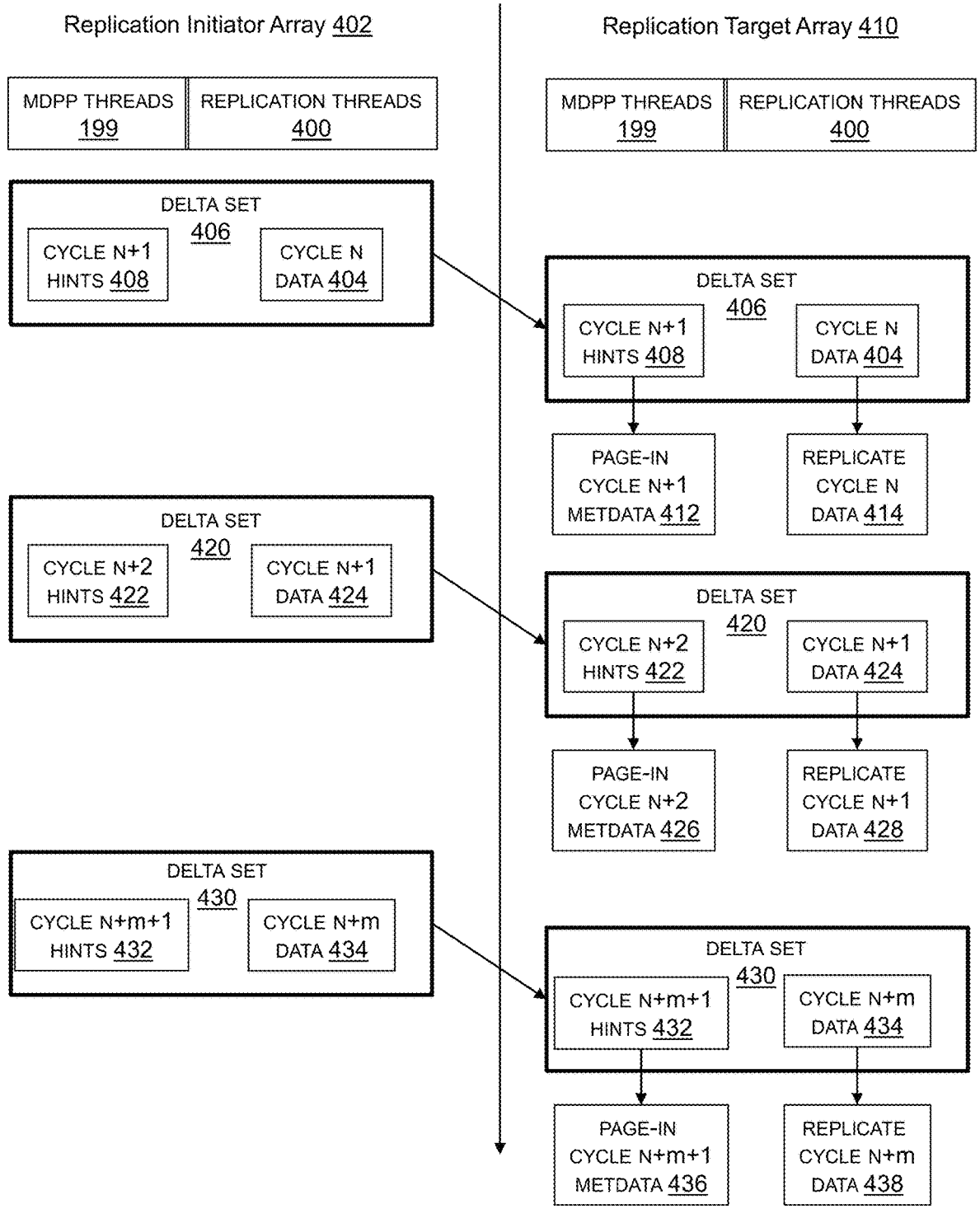
FIG. 4 illustrates asynchronous replication metadata prefetch using delta sets.

FIG. 4 illustrates asynchronous replication metadata prefetch using delta sets. Replication threads 400 running on a replication initiator array 402 add cycle N data 404 to a delta set 406, where N is an integer value that represents the succession of cycles. MDPP threads 199 running on the replication initiator array 402 add cycle N+1 metadata hints 408 to the delta set 406. The delta set 406 is sent from the replication initiator array 402 to the replication target array 410. MDPP threads 199 running on the replication target array 410 use the cycle N+1 metadata hints 408 in the delta set 406 to page-in cycle N+1 metadata 412. Replication threads 400 running on the replication target array use the cycle N data 404 in the delta set 406 to replicate the cycle N data 414.

In a successive iteration, the replication threads 400 running on the replication initiator array 402 add cycle N+1 data 424 to a delta set 420 and MDPP threads 199 running on the replication initiator array 402 add cycle N+2 metadata hints 422 to the delta set. The delta set is sent from the replication initiator array to the replication target array 410. MDPP threads 199 running on the replication target array use the cycle N+2 metadata hints in the delta set to page-in cycle N+2 metadata 426. Replication threads running on the replication target array use the cycle N+1 data to replicate the cycle N+1 data on R2 428, benefiting from a metadata cache hit because the MDPP threads 199 running on the replication target array used the cycle N+1 metadata hints 408 in delta set 406 to page-in cycle N+1 metadata 412 in the previous iteration.

In view of the description above it can be seen that in any given iteration the replication threads 400 running on the replication initiator array 402 add cycle N+m data 434 to a delta set 430 and MDPP threads 199 running on the replication initiator array 402 add cycle N+m+1 metadata hints 432 to the delta set. MDPP threads 199 running on the replication target array use the cycle N+m+1 metadata hints in the delta set to page-in cycle N+m+1 metadata 436. Replication threads running on the replication target array use the cycle N+m data to replicate the cycle N+m data on R2 438, benefiting from a metadata cache hit because the MDPP threads 199 running on the replication target array used the cycle N+m metadata hints in the previous delta set to page-in cycle N+m metadata.

Figure 5:
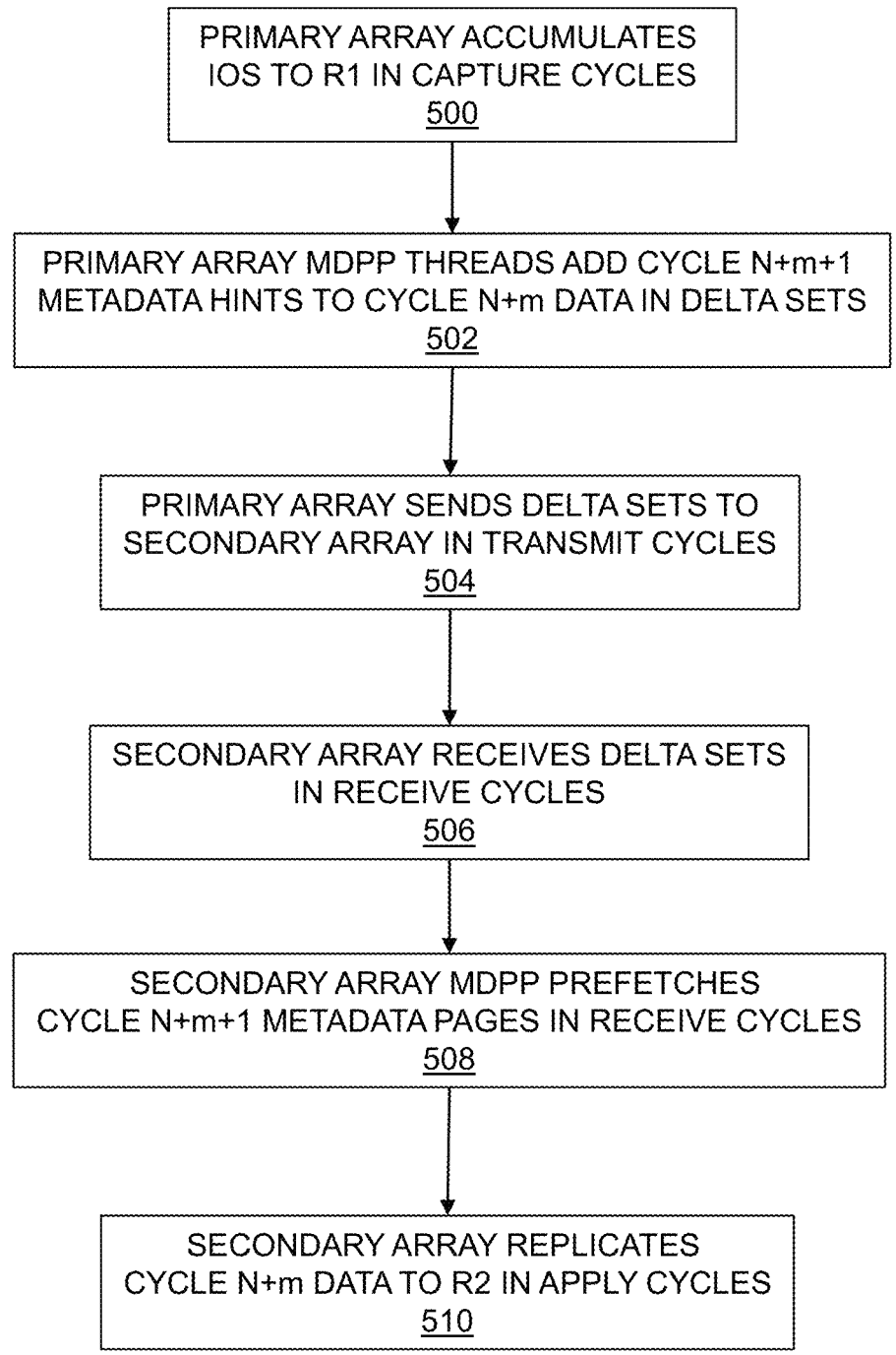
FIG. 5 illustrates a method for performing asynchronous replication using delta sets with metadata hints.

FIG. 5 illustrates a method for performing asynchronous replication using delta sets with metadata hints. The steps may be iterated in fixed time intervals. In step 500, the primary storage array accumulates write IOs to R1 in capture cycles, N, N+1, N+2, etc. MDPP threads running on the primary array add cycle N+m+1 metadata hints to cycle N+m data in delta sets as indicated in step 502. In step 504 the primary array sends delta sets to the secondary array in a transmit cycles. In step 506 the secondary array receives delta sets in receive cycles. In the receive cycles, MDPP threads running on the secondary array use cycle N+m+1 metadata hints to prefetch cycle N+m+1 metadata pages as indicated in step 508. Cycle N+m data is replicated to R2 in apply cycles as indicated in step 510, benefiting from cache hits due to the metadata page prefetch of step 508.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a plurality of non-volatile drives containing data of an R1 storage object and metadata of the R1 storage object;
at least one compute node configured to manage access to the R1 storage object, the compute node comprising multi-core processors and volatile memory, the volatile memory comprising a first partition configured to store pages of the metadata and a second partition configured to store tracks of the data; and
a first metadata prefetch thread running on the multi-core processors and configured to generate metadata hints corresponding to incoming writes to the R1 storage object, the metadata hints being sent to a remote storage system that maintains an R2 storage object that is an asynchronous replica of the R1 storage object, the first metadata prefetch thread configured to send each of the metadata hints to the remote storage system before sending associated write data to the remote storage system for replication on the R2 storage object.

2. The apparatus of claim 1 further comprising the first metadata prefetch thread sending each metadata hint and the associated write data to the remote storage system in successive transmit cycles.

3. The apparatus of claim 2 further comprising the first metadata prefetch thread configured to add cycle N+m+1 metadata hints to cycle N+m data in delta sets.

4. The apparatus of claim 3 further comprising the remote storage array receiving each metadata hint and the associated write data in successive receive cycles.

5. The apparatus of claim 4 further comprising a second metadata prefetch thread running on the remote storage system pre-fetching cycle N+m+1 metadata pages in the receive cycles.

6. The apparatus of claim 5 further comprising the remote storage system asynchronously replicating cycle N+m data to the R2 storage object in apply cycles.

7. The apparatus of claim 6 further comprising the metadata hints including an identifier of the R2 storage object and logical block addresses of the R2 storage object being updated by the corresponding write data.

8. A method comprising:
generating metadata hints corresponding to incoming writes to an R1 storage object at a first storage system;
sending the metadata hints a second storage system that maintains an R2 storage object that is an asynchronous replica of the R1 storage object; and
sending write data corresponding to the incoming writes to the R1 storage object to the remote storage system for replication on the R2 storage object after sending the metadata hints.

9. The method of claim 8 further comprising sending each metadata hint and the associated write data to the remote storage system in successive transmit cycles.

10. The method of claim 9 further comprising adding cycle N+m+1 metadata hints to cycle N+m data in delta sets.

11. The method of claim 10 further comprising receiving each metadata hint and the associated write data in successive receive cycles.

12. The method of claim 11 further comprising pre-fetching cycle N+m+1 metadata pages in the receive cycles.

13. The method of claim 12 further comprising asynchronously replicating cycle N+m data to the R2 storage object in apply cycles.

14. The method of claim 13 further comprising adding an identifier of the R2 storage object and logical block addresses of the R2 storage object being updated by the corresponding write data to the metadata hints.

15. A non-transitory computer-readable storage medium storing instructions that when executed by a computer perform a method comprising:
generating metadata hints corresponding to incoming writes to an R1 storage object at a first storage system;
sending the metadata hints a second storage system that maintains an R2 storage object that is an asynchronous replica of the R1 storage object;
sending write data corresponding to the incoming writes to the R1 storage object to the remote storage system for replication on the R2 storage object after sending the metadata hints.

16. The non-transitory computer-readable storage medium of claim 15 in which the method further comprises sending each metadata hint and the associated write data to the remote storage system in successive transmit cycles.

17. The non-transitory computer-readable storage medium of claim 16 in which the method further comprises adding cycle N+m+1 metadata hints to cycle N+m data in delta sets.

18. The non-transitory computer-readable storage medium of claim 17 in which the method further comprises receiving each metadata hint and the associated write data in successive receive cycles.

19. The non-transitory computer-readable storage medium of claim 18 in which the method further comprises pre-fetching cycle N+m+1 metadata pages in the receive cycles.

20. The non-transitory computer-readable storage medium of claim 19 in which the method further comprises asynchronously replicating cycle N+m data to the R2 storage object in apply cycles.

* * * * *